US012735640B2

(12) United States Patent
Alkhazraji et al.

(10) Patent No.: US 12,735,640 B2
(45) Date of Patent: Sep. 15, 2026

(54) ARTIFICIAL SOIL COMPOSITIONS AND RELATED METHODS

(71) Applicant: Khalifa University of Science and Technology, Abu Dhabi (AE)

(72) Inventors: Saeed Alhassan Alkhazraji, Abu Dhabi (AE); Kevin Halique, Abu Dhabi (AE)

(73) Assignee: Khalifa University of Science and Technology (AE)

( * ) Notice: Subject to any disclaimer, the term of this patent is extended or adjusted under 35 U.S.C. 154(b) by 1039 days.

(21) Appl. No.: 17/797,297

(22) PCT Filed: Feb. 3, 2021

(86) PCT No.: PCT/IB2021/050873
§ 371 (c)(1),
(2) Date: Aug. 3, 2022

(87) PCT Pub. No.: WO2021/156767
PCT Pub. Date: Aug. 12, 2021

(65) Prior Publication Data

US 2023/0062762 A1 Mar. 2, 2023

Related U.S. Application Data

(60) Provisional application No. 62/969,251, filed on Feb. 3, 2020.

(51) Int. Cl.
*C09K 17/40* (2006.01)

(52) U.S. Cl.
CPC .................................... *C09K 17/40* (2013.01)

(58) Field of Classification Search
CPC ... B09C 1/08; B09C 1/10; B09C 1/105; C02F 11/008; C02F 3/1231; Y02W 30/91;
(Continued)

(56) References Cited

U.S. PATENT DOCUMENTS

| | | | |
|---|---|---|---|
| 4,501,604 | A | 2/1985 | Odaira |
| 5,312,661 | A | 5/1994 | Suzuki et al. |

(Continued)

FOREIGN PATENT DOCUMENTS

| | | | | |
|---|---|---|---|---|
| GB | 2505588 A | * | 3/2014 | ............. A01G 24/15 |
| KR | 20070066468 A | * | 6/2007 | ............. A01G 24/20 |

(Continued)

OTHER PUBLICATIONS

Machine translation of KR-20070066468-A (Year: 2007).*
(Continued)

*Primary Examiner* — Amber R Orlando
*Assistant Examiner* — Ryan Patrick Loughran

(57) ABSTRACT

Embodiments include an artificial soil composition for supporting plant growth and related methods. The artificial soil composition may include a mixture including at least three of the following components: (a) an iron oxide-containing industrial byproduct; (b) a sulfur-containing industrial byproduct; (c) a sand component; (d) a clay component; (e) a water-soluble polymer component; (f) a nitrogen-phosphorus-potassium (NPK) source; and (g) an organic matter component. Embodiments further include a method of making an artificial soil composition, a method of growing plants in an artificial soil composition, and the like.

20 Claims, 6 Drawing Sheets

(58) Field of Classification Search
CPC ......... Y02W 10/10; Y02W 30/50; C05F 7/00; B09B 3/00; Y02A 40/20; C09K 17/40
See application file for complete search history.

(56) References Cited

U.S. PATENT DOCUMENTS

| | | | | |
|---|---|---|---|---|
| 5,472,475 A | | 12/1995 | Adam | |
| 7,175,683 B2 | * | 2/2007 | Cabello-Fuentes | C05F 7/00 71/42 |

FOREIGN PATENT DOCUMENTS

| | | | | |
|---|---|---|---|---|
| KR | 101257448 B1 | * | 4/2013 | C04B 22/145 |
| KR | 101285369 B1 | | 7/2013 | |
| KR | 20150094745 A | | 8/2015 | |
| WO | 2017125396 A1 | | 7/2017 | |

OTHER PUBLICATIONS

Machine translation of KR-101257448-B1 (Year: 2013).*
Sulphur Institute, “An Introduction to Sulphur” (Year: 2019).*
International Search Report and Written Opinion Received for PCT/IB2021/050873, mailed May 7, 2021.

* cited by examiner

ARTIFICIAL SOIL COMPOSITIONS AND RELATED METHODS

BACKGROUND

Conventional artificial soils are difficult to prepare and do not permit tailoring of components to meet the specific needs of a plant species (e.g., various crops) and/or to thrive under certain environmental conditions. In addition, due to the complexity of the methods of preparing conventional artificial soils, commercial production of conventional artificial soils has yet to be achieved as the processes are difficult to scale or cannot be scaled.

SUMMARY

According to one aspect of the invention, an artificial soil composition for supporting plant growth is provided. The artificial soil composition may include one or more of the following components: (a) an iron oxide-containing industrial byproduct; (b) a sulfur-containing industrial byproduct; (c) a sand component; (d) a clay component; (e) a water-soluble polymer component; (f) a nitrogen-phosphorus-potassium (NPK) source; and (g) an organic matter component.

According to another aspect of the invention, a method of making an artificial soil composition is provided. The method of making an artificial soil composition may include one or more of the following steps, each of which may be repeated one or more times and/or performed in any order: (a) adding water to one or more first components to form an aqueous solution; (b) mixing one or more second components to form a first mixture; (c) extruding one or more third components to form an extrudate; (d) mixing one or more of the aqueous solution, the first mixture, and the extrudate to form a second mixture; and (e) processing one or more of the aqueous solution, the solid mixture, the extrudate, and the second mixture to form an artificial soil composition.

According to a further aspect of the invention, a method of growing plants in an artificial soil composition is provided. The method of growing plants in an artificial soil composition may include disposing at least one of a seed and a plant in an artificial soil composition and supporting the growth of the seed or plant.

DETAILED DESCRIPTION

Discussion

Figure 1:
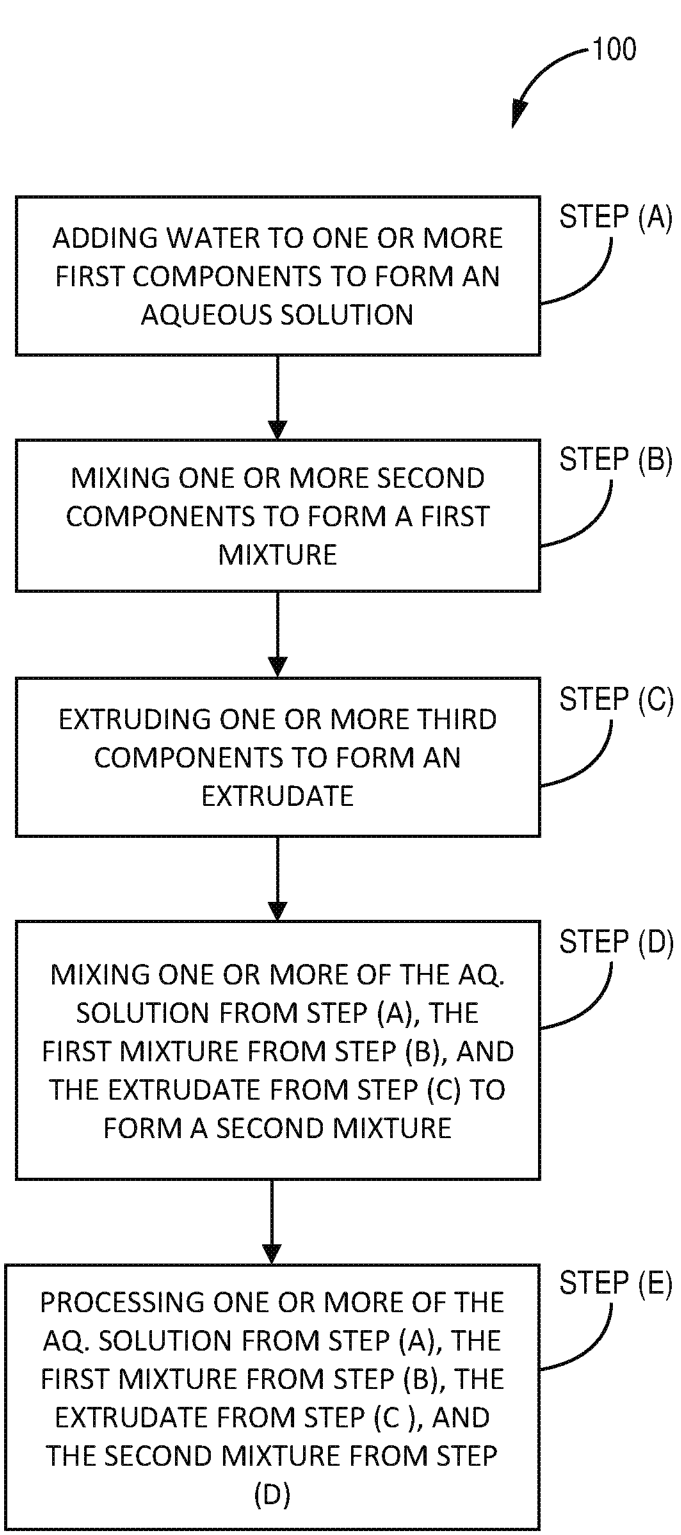
FIG. 1 is a flowchart of a method of making an artificial soil composition, according to one or more embodiments of the invention.

The present invention relates to artificial soil compositions for supporting plant growth, a method of making an artificial soil composition, a method of growing plants in an artificial soil composition, and the like. The artificial soil compositions of the present disclosure may include select combinations of one or more components. For example, in some embodiments, a sulfur-containing industrial byproduct and an iron oxide-containing industrial byproduct may be combined with one or more other components (e.g., sand components, clay components, polymer components, nitrogen sources, phosphorus sources, potassium sources, and/or organic matter components) to produce fertile artificial soil compositions containing nutrients, in appropriate proportions, capable of sustaining and supporting the growth of a wide variety of plants. The methods of preparing artificial soil compositions provided herein are general and may be tailored to a specific geographic region, a particular plant species or genus, and/or a certain environmental condition (e.g., precipitation, climate, etc.).

The present invention provides numerous advantages over conventional artificial soil compositions and conventional methods. For example, advantages of the present invention include, without limitation, the ability to produce a wide array of artificial soil compositions for different applications and/or different plants, including a multitude of crops. The present invention also achieves a reduction of waste and a production of artificial soils in quantities suitable for large-scale production and soil substitution. The present invention further permits tailoring soil properties and/or characteristics, such as for example one or more of nutrients availability, minerals availability, water retention, organic matter availability, porosity, and soil particle size, among others, to a geographic region, a plant species or genus, and/or an environmental condition. In addition to being general, the methods of preparing fertile artificial soil compositions are simple, scalable, and economical.

Embodiments provide artificial soil compositions for supporting plant growth. The artificial soil compositions may include one or more of the components (a) to (g):

(a) an iron oxide-containing industrial byproduct;

(b) a sulfur-containing industrial byproduct;

(c) a sand component;

(d) a clay component;

(e) a polymer component;

(f) one or more of a nitrogen source, a phosphorus source, and a potassium source; and (g) an organic matter component.

In some embodiments, the artificial soil compositions include a mixture of at least two of the components (a) to (g), or more preferably a mixture of at least three of the components (a) to (g). Unless otherwise provided herein, conventional components may further be included in the mixture without departing from the scope of the present invention.

The artificial soil compositions of the present disclosure are fertile in that said artificial soil compositions are capable of supporting and/or support plant growth. In some embodiments, although an artificial soil composition of the present disclosure may include a fertilizer component (e.g., such as a nitrogen-phosphorus-potassium (NPK) source), the artificial soil composition may be distinguished from a fertilizer component in that the artificial soil compositions disclosed herein may have or may provide soil structure or a soil structure characteristic. For example, in some embodiments, the artificial soil compositions disclosed herein may by themselves, without other components, support plant growth; whereas fertilizers, without other components, cannot support plant growth.

As described herein, the artificial soil compositions and related methods of making permit tailoring of the proportions or amounts of the components thereof. For example, the artificial soil compositions and related methods allow the percentages by weight of each component to be tuned and/or tailored across a wide range of weight percentages, providing the ability to meet the precise requirements of a particular application. For example, the percentage by weight of each component may be selected based on the specific geographic region, the plant genus or species to be grown, and/or the environmental condition of the area in which plant growth is to occur. Accordingly, the percentage by weight of each component may vary independently between 0% by weight and 100% by weight (e.g., less than 100% by weight) and may have any value including and between 0% by weight and 100% by weight in increments of 0.1 or 0.01 weight percent. Unless otherwise provided herein, all percentages by weight are based on total weight of the artificial soil composition.

In some embodiments, for example, the artificial soil composition includes from about 15%-25% by weight of the iron oxide-containing industrial byproduct. In some embodiments, the artificial soil composition includes from about 5%-10% by weight of the sulfur-containing industrial byproduct. In some embodiments, the artificial soil composition includes from about 40%-90% by weight of the sand component. In some embodiments, the artificial soil composition includes from about 5%-20% by weight of the clay component. In some embodiments, the artificial soil composition includes from about 1%-5% by weight of the water-soluble polymer component. In some embodiments, the artificial soil composition includes from about 2.5%-7.5% by weight of the NPK source. In some embodiments, the artificial soil composition includes from about 15%-20% by weight of the organic matter component. These are provided as one example and thus shall not be limiting as the weight percentage of each component may vary between 0% and 100% (e.g., at increments of 0.01%), inclusive, as mentioned above.

The weight ratio of the sand component to the clay component may also vary to meeting the requirements of the application as described above in the discussion of weight percentages of each component. The amount of the sand component relative to the clay component may be varied to achieve the appropriate balance of nutrient retention and water retention. For example, sandy soils may suffer from lack of plant nutrients because sandy soils tend to be very porous and thus have poor water retention capacity and/or water holding capacity, whereas clay soils tend to over absorb water, making clay soils prone to erosion. In some embodiments, the mass of the sand component is about equal to the mass of the clay component. For example, in some components, the weight ratio of the sand component to the clay component is at least 50:50. In some embodiments, the mass of the sand component is greater than the mass of the clay component. For example, in some embodiments, the weight ratio of the sand component to the clay component is 60:40. In some embodiments, the weight ratio of the sand component to the clay component is 70:30. These shall not be limiting as any weight ratio in which the sand component is equal to or greater than the clay component may be utilized herein.

The iron oxide-containing industrial byproduct may include an industrial byproduct including an iron oxide. Iron oxides are considered a micronutrient utilized by plants. A non-limiting example of an iron oxide-containing industrial byproduct is bauxite residue. Bauxite residue, or red mud, may be described as solid waste generated from alumina refining of bauxite ore. Bauxite residue may include a mixture of metal oxides, owing its red coloring to iron oxides which generally comprise about 20%-60% of the residue. Bauxite residue may further include one or more of silica, alumina, titanium oxides, trace amounts of many other types of metals. The high alkalinity of bauxite residue may make it difficult to dispose of. In some embodiments, the iron oxide-containing industrial byproduct is a preprocessed iron oxide-containing industrial byproduct as discussed below.

The sulfur-containing industrial byproduct may include an industrial byproduct including sulfur. Sulfur is considered a secondary macronutrient essential for plant growth. The sulfur-containing industrial byproduct may be recovered from at least one of oil refining, natural gas processing, and metal smelting. For example, the sulfur-containing industrial byproduct may include industrial byproducts including sulfur capable of being used, with or without additional processing, for the production of sulfuric acid. Accordingly, the sulfur-containing industrial byproducts may be included in the artificial soil compositions of the present disclosure, rather than be used for the production of sulfuric acid. In some embodiments, the sulfur-containing industrial byproduct is a preprocessed sulfur-containing industrial byproduct as discussed below.

The sand component includes at least sand. Sand as a soil is highly porous and lacks the ability to retain nutrients to promote plant growth. An example of one type of sand suitable for inclusion in the sand component is fine desert sand, which is readily and abundantly available from locations such as the United Arab Emirates. Among other things, it has been discovered that the fine desert sand may be included in the artificial soil compositions to obtain fertile artificial soil compositions suitable for supporting plant growth. The sand component may include sand having a diameter ranging from about 1/16 mm to about 1/2 mm; although other diameters are possible and within the scope of the present disclosure. As mentioned above, the clay component may complement the sand component in that its presence with sand makes the resulting artificial soil composition less porous, improving the soil's ability to hold and retain water. The relative proportions of the clay component and the sand component may be varied to achieve a desirable particle size for the soil. The clay component may include at least one of a natural clay, a synthetic clay, and a chemically modified clay. Examples of suitable clay components include, without limitation, at least one of the following: a laponite clay, a kaolinite clay, an illite clay, a montmorillonite clay, a muscovite clay, a saponite clay, a nontronite clay, a hectorite clay, a beidellite clay, a smectite clay, and a sauconite clay.

The polymer component may include at least one of a water-soluble polymer component and a melt-processable polymer component. The polymer component may include a polymer selected from synthetic polymers, natural polymers (e.g., biopolymers, and the like), and combinations thereof. In some embodiments, the polymer component includes a water-soluble polymer, a melt-processable polymer, or a combination thereof. Examples of suitable synthetic water-soluble polymers include, without limitation, one or more of poly(ethylene glycol), polyvinyl pyrrolidone, polyvinyl alcohol, polyvinyl acetate, polyacrylamide, polyoxazoline, polyphosphates, and derivatives thereof. Examples of suitable natural water-soluble polymers include, without limitation, one or more of xanthan gum, chitosan, agar, pectin, albumin, polysaccharides (e.g., gum Arabic), and derivatives thereof. Agar is one example of a water-soluble polymer which also provides an organic component needed for soil to thrive. One or more of the synthetic water-soluble polymers and/or one or more of the natural water-soluble polymers may form copolymers. For example, suitable water-soluble polymers may include copolymers including at least one water-soluble polymer unit. Copolymers may include, for example and without limitation, alternating copolymers, random copolymers, block copolymers, graft copolymers, and the like. In some embodiments, water-soluble polymer and water-soluble polymer component are used interchangeably with melt-processable polymer component and melt-processable polymer. In some embodiments, the water-soluble polymer is a melt-processable polymer and the water-soluble polymer component is a melt-processable polymer component.

One or more of the nitrogen source, the phosphorus source, and the potassium source may be included in the artificial soil composition. In some embodiments, an NPK source is included, wherein the NPM source includes the nitrogen source, the phosphorus source, and the potassium source. In some embodiments, the artificial soil composition includes one or more of a nitrogen source, a phosphorus source, and a potassium source which are provided independently and individually, or the nitrogen source, the phosphorus source, and the potassium source may be combined and provided as a nitrogen-phosphorus-potassium (NPK) source. Examples of suitable NPK sources include, without limitation, at least one of a commercially available fertilizer, a compost (e.g., from a waste management company), and an organic source (e.g., manure), a tea leaves, and the like.

The organic matter component may include, without limitation, at least one of an activated carbon, a compost, tea leaves, a crushed charcoal, and the like.

FIG. 1 is a flowchart of a method 100 of making an artificial soil composition, according to one or more embodiments of the invention. The method 100 of making an artificial soil composition may include one or more of the following steps (a) to (e):

(a) adding water to one or more first components to form an aqueous solution, wherein the one or more first components include one or more of a first iron oxide-containing industrial byproduct, a first sulfur-containing industrial byproduct, a first sand component, a first clay component, a first water-soluble polymer component, a first melt-processable polymer component, a first nitrogen source, a first phosphorus source, a first potassium source, and a first organic matter component;

(b) mixing one or more second components to form a first mixture, wherein the one or more second components include one or more of a second iron oxide-containing industrial byproduct, a second sulfur-containing industrial byproduct, a second sand component, a second clay component, a second water-soluble polymer component, a second melt-processable polymer component, a second nitrogen source, a second phosphorus source, a second potassium source, and a second organic matter component, and wherein the first mixture is a solid mixture;

(c) extruding one or more third components to form an extrudate, wherein the one or more third components include one or more of a third iron oxide-containing industrial byproduct, a third sulfur-containing industrial byproduct, a third sand component, a third clay component, a third water-soluble polymer component, a third water-soluble polymer component, a third nitrogen source, a third phosphorus source, a third potassium source, and a third organic matter component;

(d) mixing one or more of the aqueous solution from step (a), the first mixture from step (b), and the extrudate from step (c) to form a second mixture; and (e) processing one or more of the aqueous solution from step (a), the first mixture from step (b), the extrudate from step (c), and the second mixture from step (d).

In some embodiments, the method 100 further includes a step (f) in which the iron oxide-containing industrial byproduct and/or the sulfur-containing industrial byproduct is/are preprocessed (e.g., prior to performing one or more of steps (a) to (e)). For example, in some embodiments, the method 100 further includes a step (f) including preprocessing one or more of the first iron oxide-containing industrial byproduct, the second iron oxide-containing industrial byproduct, the third iron oxide-containing industrial byproduct, the first sulfur-containing industrial byproduct, the second sulfur-containing industrial byproduct, and the third sulfur-containing industrial byproduct.

As mentioned above, the method 100 may include performing one or more of the steps (a) to (f). Any combination of the steps (a) to (f) may be employed, and the steps (a) to (f) may be performed in any order. In addition, method 100 may include repeating one or more of steps (a) to (f).

Any of the iron oxide-containing industrial byproducts, the sulfur-containing industrial byproducts, the sand components, the clay components, the water-soluble polymer components, the nitrogen sources, the phosphorus sources, the potassium sources, and the organic matter components of the present disclosure may be utilized herein.

In some embodiments, only one of a specific type of component is included in the artificial soil composition. For example, in some embodiments, if the aqueous solution includes the first water-soluble polymer component, the second and third water-soluble polymer components are not present in the first mixture and the extrudate, respectively. Similarly, in some embodiments, if the first mixture includes the second water-soluble polymer component, the first and third water-soluble polymer components are not present in the aqueous solution and the extrudate, respectively. This may extend to any of the other one or more types of components, including without limitation the one or more first components, one or more second components, and/or one or more third components.

In step (a), water may be added to one or more of the first components to form an aqueous solution. The step (a) is suitable for a wide range of components included in the formulation of the artificial soil compositions of the present disclosure. The performance of step (a) may promote the formation of a homogeneous final product (e.g., to ensure a high degree of homogeneity, even at the micrometer level/scale). For example, dispersion of synthetic and/or natural water-soluble polymers in soil may be improved by dissolving and/or solubilizing said water-soluble polymers in water (e.g., optionally prior to being contacted with one or more of the other components). Accordingly, in some embodiments, step (a) includes dissolving and/or solubilizing a water-soluble polymer, such as agar, in water to obtain the water-soluble polymer component. In some embodiments, step (a) includes dispersing a clay in water or adding water to clay and optionally allowing the clay to swell to obtain the clay component. In some embodiments, step (a) further includes heating the aqueous solution at or to a temperature of less than about 100° C.

In step (b), one or more of the second components is combined to form the first mixture (e.g., a mixture of solids). In some embodiments, step (b) includes combining or mixing by one or more of crushing, milling, grinding, etc. In some embodiments, step (b) is performed in the absence of any water, any solvent, and/or any other type of liquid. For example, in some embodiments, the mixture of solids excludes any water and is a dry mixture. In this way, step (b) may provide the advantage of minimizing the use of water, while also providing a simplified route to making and obtaining a final artificial soil product. In some embodiments, step (b) includes combining one or more solid-state components. For example, in some embodiments, one or more of the iron oxide-containing industrial byproduct, the sulfur-containing industrial byproduct, the sand component, the clay component, the water-soluble polymer component, the nitrogen source, the phosphorus source, the potassium source, and the organic matter component is a solid. For example, the mixture may include one or more of a solid iron oxide-containing industrial byproduct, a solid sulfur-containing industrial byproduct, a solid sand component, a solid clay component, a solid water-soluble polymer component, a solid nitrogen source, a solid phosphorus source, a solid potassium source, and a solid organic matter component. In some embodiments, step (b) is employed to control soil texture which is adjusted to control aeration in soil.

In step (c), one or more of the third components may be extruded to obtain an extrudate. For some components, step (c) may provide better mixing of components than, for example, step (a) and/or (b). In some embodiments, step (c) may include heating and mixing one or more of the components in an extruder at about the same time. For example, the one or more components may be added to an extruder, and for higher viscosity mixtures to high shear extruders, to obtain an extrudate. Low-melting components, or melt-processable components, including polymers, may be used to form a mixing medium, or the resulting extrudate may be allowed to cool and then combined with one or more of the other components from any of the other steps. In some embodiments, one or more of the water-soluble polymer component (e.g., an artificial or synthetic water-soluble polymer, a natural water-soluble polymer such as a biopolymer, etc.) and the sulfur-containing industrial byproduct is extruded to form an extrudate. In some embodiments, the water-soluble polymer component is added to the extruder and, while the water-soluble polymer component is in a molten phase, one or more of the other components is added to the molten-phase water-soluble polymer component and extruded to form an extrudate. At least one advantage of this step is that biopolymers may carbonize at moderate temperatures; this carbonized mass may be useful to achieve artificial soil compositions with or without the use of charcoal or other carbon sources, like compost. At least another advantage of this step is that the method may be employed in a factory or on-site.

In step (d), one or more of the aqueous solution from step (a), the solids mixture from step (b), and the extrudate from step (c) may be combined and/or mixed to form the second mixture. In some embodiments, water is added to the second mixture to form a slurry or to promote formation of a slurry. Step (d) offers flexibility in terms of achieving specific weight percentages of one or more components. For example, some components may not particularly processable in water, or suitable for crushing or grinding and therefore steps (a) through (c), for example, may be selected from, depending on the component, to obtain artificial soil compositions with precise or specific proportions of components. Although not required, this step (as well as the other steps (a) to (f)) may, for example, permit preparation of an artificial soil composition with specific component proportions that are tailored to a particular geographic region, plant species or genus, and/or environmental condition.

In step (e), one or more of the aqueous solution from step (a), the solids mixture from step (b), the extrudate from step (c), and the second mixture from step (d) are processed. In some embodiments, step (e) includes grinding, mixing, crushing, or milling, among other processes used for reducing a particle size of a solid and/or at least a partially solid component. In some embodiments, step (e) includes or further includes drying to remove water and/or solvent(s). In some embodiments, step (e) includes or further includes adding water. In some embodiments, step (e) includes filtering, sieving, etc. (e.g., using a mesh screen).

In step (f), the iron oxide-containing industrial byproduct and/or the sulfur-containing industrial byproduct may be preprocessed. More generally, the iron oxide-containing industrial byproduct (e.g., bauxite residue) and/or the sulfur-containing industrial byproduct may be used raw (e.g., without any processing) or may be subjected to one or more processing steps. The processing of the iron oxide-containing industrial byproduct and the sulfur-containing industrial byproduct may include physical processing and/or chemical processing. The physical processing may include one or more of crushing (e.g., grinding, milling, etc.) to control and/or reduce particle size, compressing to form thin layers, and sieving to separate different particle sizes. The chemical processing may include one or more of oxidizing to form oxides which may be useful for plants (this can be done by using acids or by combustion process), crosslinking of the sulfur-containing industrial byproducts to form linear sulfur polymers/compounds, and complexation of metals with organic moieties.

In some embodiments, the method 100 includes dissolving or dispersing at least one of the first components in water and mixing the aqueous components and the non-aqueous components (e.g., dry components) all at once to form a wet mixture, followed by drying at atmospheric conditions. The process may be implemented at a factory or on-site. For processes implemented at a factory, the water may be recovered for reuse. For processes implemented on-site, the wet product may be pumped into the ground where the product is desired to be used. Accordingly, the process may be readily scaled up for commercial production.

In some embodiments, the method 100 includes adding water to clay and allowing the clay to swell. In some embodiments, the agar is dissolved in water while being heated at a temperature just below the boiling point of water. In some embodiments, the agar solution is not allowed to cool or heat is maintained to prevent the agar solution from forming a jelly. In some embodiments, the clay and agar solution are placed in an agitator mixer in combination with one or more of the second and/or third components. In some embodiments, additional water is added to the mixture to create a slurry. In some embodiments, after mixing, the mixture undergoes a drying process to remove all the water. In some embodiments, the dried mixture is crushed, grinded, or milled to create fine particles of artificial soil.

In some embodiments, one or more components are physically mixed in an agitator mixer without the addition of water. In some embodiments, after thorough mixing, the soil is ready. The rpm can be set at a higher rate while controlling the temperature of the mixture.

In some embodiments, the water-soluble polymer component is dissolved in water to from an aqueous solution. In some embodiments, the sulfur-containing industrial byproduct and the sand component are mixed, without the addition of any water, and crushed/ball milled together to form a solid mixture. In some embodiments, the solid mixture is added to the aqueous solution and agitated thoroughly using a mixer. In some embodiments, the resultant wet mixture is dried and the solid is crushed to final form to obtain the artificial soil composition.

In some embodiments, the clay component is dispersed in water to obtain an aqueous solution. In some embodiments, a sulfur-containing industrial byproduct and a water-soluble polymer, such as a biological polymer (e.g., agar or chitosan), are extruded together at a high temperature (e.g., temperatures in the range of 100-250° C.), which leads to the formation of oxidized sulfur ($SO_2$) which is also useful as a fertilizer and sulfur carrier. Additionally, the biological polymer may be the source of solid carbon (which is useful for plant growth). In some embodiments, the sand component and bauxite residue are separately mixed in solid state and/or crushed and/or ball milled together to obtain a solid mixture. In some embodiments, the extrudate and solid mixture are dispersed in the aqueous solution containing clay and all are mixed together thoroughly. In some embodiments, the resulting product is dried to remove water and subsequently optionally crushed to obtain the final product.

In some embodiments, a third water-soluble polymer component (e.g., a biological polymer) is extruded at a high temperature selected based on its melting point. In some embodiments, one or more of the third sulfur-containing industrial byproduct, the third iron oxide-containing industrial byproduct, the third sand component, the third organic matter component, and optionally one or more of the other third components of the present disclosure are added to the extruder while the third water-soluble polymer component is in a molten state. In some embodiments, the extrudate is produced and allowed to cool to room temperature. In some embodiments, the extrudate is crushed/ball milled to obtain the artificial soil composition.

In some embodiments, the artificial soil composition includes a sand component, an iron oxide-containing industrial byproduct (e.g., a bauxite residue), a sulfur-containing industrial byproduct, a clay component including a laponite clay, a water-soluble polymer component including agar (e.g., a natural polymer used mainly for cooking), and nitrogen-phosphorus-potassium NPK source; all of which are combined to obtain an artificial soil composition. In some embodiments, for example, the aforementioned components are combined to form a slurry to provide a homogenous component mixture. In some embodiments, the process starts with adding water to the clay (e.g., 10-15% by weight of total mixture), and allowing the clay swell; agar is dissolved in water while being heated at a temperature just below the boiling point of water; the agar solution is not =allowed to cool down to prevent formation of a jelly; the clay and agar solution may be placed in an agitator mixer together with all the other materials. Additional water may optionally be added to the mixture to create a better slurry. After mixing, the mixture may undergo a drying process to remove all the water. The dried mixture may then be crushed creating fine particles of the artificial soil composition.

Figure 2:
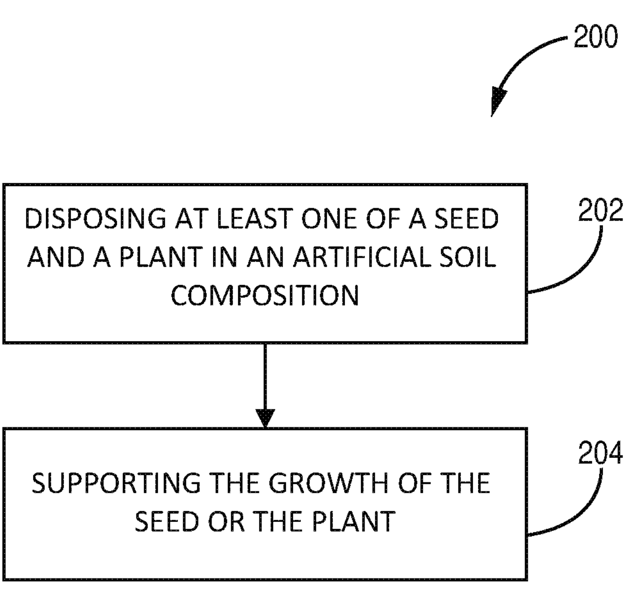
FIG. 2 is a flowchart of a method of growing a plant in an artificial soil composition, according to one or more embodiments of the invention.

FIG. 2 is a flowchart of a method of growing plants using the artificial soil compositions of the present disclosure. As shown in FIG. 2, the method of growing plants 200 may include disposing 202 at least one of a seed and a plant in an artificial soil composition of the present disclosure and supporting 204 the growth of the seed or plant. For example, one or more seeds may be disposed 202 (e.g., planted) in the artificial soil composition and/or one or more plants may be disposed 202 (e.g., transplanted) in the artificial soil composition. The growth of seed(s) and/or plant(s) may be supported 204 by techniques known in the art, such as for example watering, fertilizing, treating with pesticides, etc. Any of the artificial soil compositions of the present disclosure may be utilized herein.

Example 1

Artificial Soil Composition 1

Artificial soil composition 1 was prepared by a wet method. To prepare the artificial soil composition 1, water was added to a clay, and the clay was allowed to swell. Agar was dissolved in water while being heated at a temperature slightly below the boiling point of water to form an agar solution. The temperature of the agar solution was monitored and maintained (not allowed to cool) to prevent formation of a jelly-like substance. The clay and agar solution were placed in an agitator and mixed together with sand, bauxite residue, sulfur-containing industrial byproduct, and an NPK source. Additional amounts of water were selectively added to the mixture to promote formation of a slurry. Following the mixing process, the mixture underwent drying to remove the water and then the dried mixture was crushed to create fine particles of artificial soil. The resulting artificial soil composition 1 included about 30% by weight sand, about 15% by weight clay, about 30% by weight bauxite residue, about 2.5% by weight agar, about 17.5% by weight sulfur, and about 5% by weight NPK source.

Example 2

Artificial Soil Composition 2

Artificial soil composition 2 was prepared by a wet method. To prepare the artificial soil composition 2, water was added to a clay, and the clay was allowed to swell. Agar was dissolved in water while being heated at a temperature slightly below the boiling point of water to form an agar solution. The temperature of the agar solution was monitored and maintained (not allowed to cool) to prevent formation of a jelly-like substance. The clay and agar solution were placed in an agitator and mixed together with sand, bauxite residue, sulfur-containing industrial byproduct, and an NPK source. Additional amounts of water were selectively added to the mixture to promote formation of a slurry. Following the mixing process, the mixture underwent drying to remove all or at least a substantial portion of the water and then the dried mixture was crushed to create fine particles of artificial soil. The resulting artificial soil composition 2 included about 70% by weight sand, about 5% by weight clay, about 15% by weight bauxite residue, about 1.5% by weight agar, about 6% by weight sulfur, and about 2.5% by weight NPK source.

Example 3

Artificial Soil Composition 3

Artificial soil composition 3 was prepared by a wet method. To prepare the artificial soil composition 3, water was added to a clay, and the clay was allowed to swell. Agar was dissolved in water while being heated at a temperature slightly below the boiling point of water to form an agar solution. The temperature of the agar solution was monitored and maintained (not allowed to cool) to prevent formation of a jelly-like substance. The clay and agar solution were placed in an agitator and mixed together with sand, bauxite residue, sulfur-containing industrial byproduct, and an NPK source. Additional amounts of water were selectively added to the mixture to promote formation of a slurry. Following the mixing process, the mixture underwent drying to remove all or at least a substantial portion of the water and then the dried mixture was crushed to create fine particles of artificial soil. The resulting artificial soil composition 3 included about 70% by weight sand, about 5% by weight clay, about 0.5% by weight bauxite residue, about 1.5% by weight agar, about 11% by weight sulfur, and about 12% by weight NPK source.

Example 4

Artificial Soil Composition 4

Artificial soil composition 4 was prepared by a dry method. To prepare the artificial soil composition 4, sand, clay, tea leaves, sulfur-containing industrial byproduct, and bauxite residue were physically mixed in an agitator without the addition of water until thoroughly mixed. The resulting artificial soil composition 4 included about 87.59% by weight sand, about 2.92% by weight clay, about 5.11% by weight tea leaves, about 2.92% by weight sulfur, and about 1.46% by weight bauxite residue. For this artificial soil composition 4, bags of tea leaves were used instead of a NPK fertilizer as tea leaves are rich in phosphorous and nitrogen. It can also act as an organic matter in the soil. In this way the compositions can be altered based on the needs of the plant and the species or genus of plant.

Example 5

Artificial Thailand Soil Composition 1

Artificial Thailand soil composition 1 was prepared by a dry method. To prepare the artificial Thailand soil composition 1, sand, clay, and organic compost were physically mixed in an agitator without the addition of water until thoroughly mixed. The resulting artificial Thailand soil composition 1 included about 72% by weight sand, about 8% by weight clay, and about 20% by weight organic compost.

Example 6

Artificial Thailand Soil Composition 2

Artificial Thailand soil composition 2 was prepared by a dry method. To prepare the artificial Thailand soil composition 1, sand, clay, and organic compost were physically mixed in an agitator without the addition of water until thoroughly mixed. The resulting artificial Thailand soil composition 2 included about 80% by weight sand, about 5% by weight clay, and about 15% by weight organic compost.

Example 7

Artificial Thailand Soil Composition 3

Artificial Thailand soil composition 3 was prepared by a dry method. To prepare the artificial Thailand soil composition 1, sand, clay, and organic compost were physically mixed in an agitator without the addition of water until thoroughly mixed. The resulting artificial Thailand soil composition 3 included about 82% by weight sand, about 3% by weight clay, and about 15% by weight organic compost.

Example 8

Comparison of Artificial Thailand Soil Compositions 1-3 to Actual Thailand Soils A comparison of artificial Thailand soil compositions 1-3 to the constitutional makeup of actual Thailand soils confirms the successful recreation of the actual Thailand soils as the artificial Thailand soil compositions 1-3. See Tables 1-2 below.

TABLE 1

Elemental Composition of Cambisoil Soil
Elemental composition of Cambisoil soil

| Depth (cm) | $Al_2O_3$ % | CaO % | $Fe_2O_3$ | $K_2O$ % | MgO % | $SiO_2$ % | $TiO_2$ % |
|---|---|---|---|---|---|---|---|
| 0-13 | 1.6 | 0.06 | 0.9 | 0.14 | 0.11 | 97.5 | 0.28 |
| 13-25 | 3 | 0.06 | 0.9 | 0.2 | 0.23 | 95.1 | 0.31 |
| 25-98 | 4.9 | 0.03 | 1.3 | 0.31 | 0.19 | 90.7 | 0.36 |
| 98-135 | 5.9 | 0.03 | 1.4 | 0.35 | 0.21 | 89.9 | 0.39 |

TABLE 2 https://museum.isric.org/monoliths/reference-soil-thailand-13

TABLE 2

Elemental Composition of Artificial Thailand Soil Compositions 1-3

| | Thailand Soil 1 | Thailand Soil 2 Mass Fraction (%) | Thailand Soil 3 |
|---|---|---|---|
| Al | 1.5303 | 1.1329 | 0.7962 |
| | 1.5105 | 1.0384 | 0.8196 |
| Ca | 15.27 | 15.44 | 14.86 |
| | 14.8 | 15.46 | 15.55 |
| Fe | 1.74 | 1.342 | 1.0731 |
| | 1.6942 | 1.328 | 1.0785 |
| Si | 9.9008 | 9.59 | 8.7158 |
| | 9.9567 | 9.74 | 9.0354 |
| Mg | 2.78 | 2.65 | 2.17 |
| | 2.72 | 2.55 | 2.53 |
| Ti | 0.278 | 0.1969 | 0.1038 |
| | 0.2592 | 0.1796 | 0.0934 |
| P | 1.0497 | 0.5775 | 1.2801 |
| | 1.0679 | 0.5726 | 1.2957 |

Table 3

The elemental composition of the artificial Thailand soil compositions 1-3 were determined using X-ray fluorescence analysis (XRF). Samples of each artificial Thailand soil composition 1-3 were analyzed two times, so two sets of data are shown in Table 2. All of elements in Table 1 which is Cambisol soil (a type of fertile soil in Thailand) are also present in the artificial Thailand soil compositions 1-3. A comparison of the Tables 1-2 confirmed the ability to recreate an improved version of Thailand soil. For example, the data shows increased concentrations of calcium and phosphorus, both of which are elements plants need, in the artificial Thailand soil compositions than in the actual Thailand soils.

Example 9 pH Measurement

A pH recorder was used to measure pH for the samples. The measured pH ranged strongly acidic to slightly acidic, with pH measurements of less than 6.5 and even less than 5. This is ideal for plant growth as most of the elemental needs of plants are more soluble or available in acidic soils than in neutral or alkaline soils.

Example 10

Water Holding Capacity

The water-holding capacity of the artificial soil compositions from Examples 1 to 7 were measured. Water-holding capacity was determined using a poly (vinyl chloride) centrifuge tube of 3 cm diameter, into which a hole was created on the bottom of the tube. The bottom hole of the tube was sealed with cotton. Soil samples (40 g) were placed in the tube, then weighed ($W_1$) together with the tube. The samples were slowly drenched from the top using tap water until the water seeped out of the bottom. The experiment was conducted at normal room conditions with relative humidity 35% to 50% at room temperature (20 to 25° C.). After water seepage has stopped from the bottom, the tube was weighed again ($W_2$). Water—holding capacity was calculated with the following equation:

$$\text{Water}-\text{holding capacity }(\%)=\frac{W2-W1}{40}$$

Figure 3:
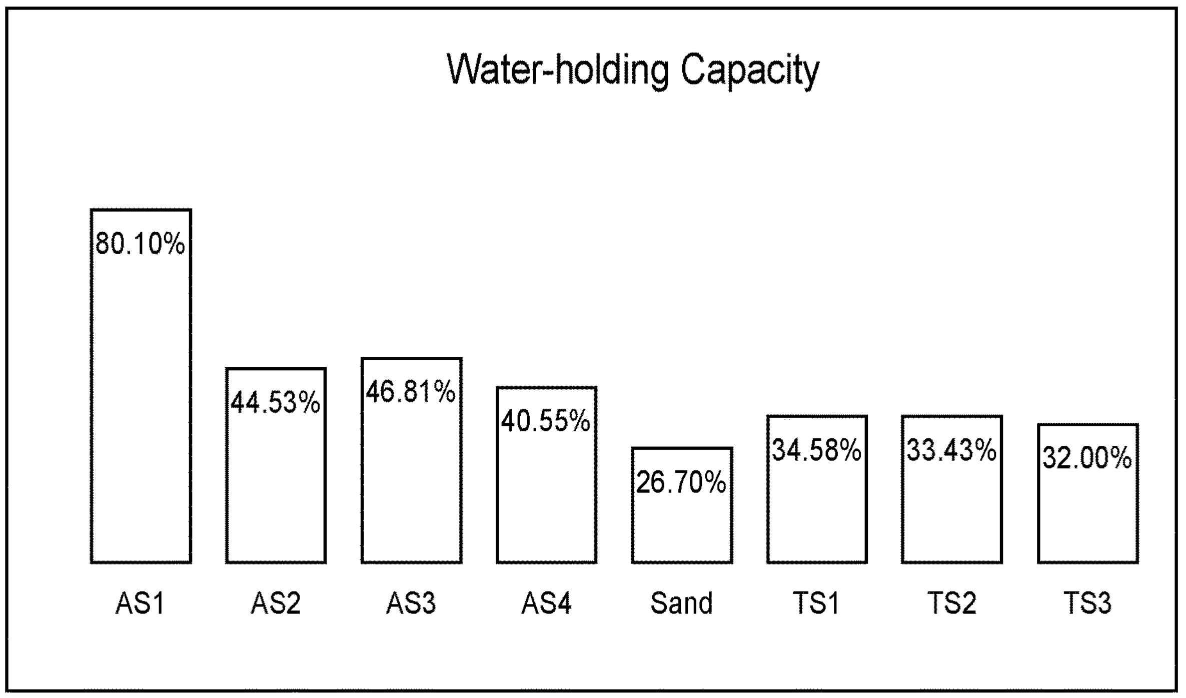
FIG. 3 is a graphical view of water holding capacity for artificial soil composition 1, artificial soil composition 2, artificial soil composition 3, artificial soil composition 4, sand, artificial Thailand soil composition 1, artificial Thailand soil composition 2, and artificial Thailand soil composition 3, according to one or more embodiments of the invention.

It was observed that clay concentration played a role in water-holding capacity of the soil as shown in FIG. 3. It was also observed that too high of a water-holding capacity may not be beneficial to plant growth as the porosity would be substantially lower limiting the ability for roots to grow and expand. A significant difference in the capacity of normal sand in comparison to the artificial soil compositions from Example 1-7 above was observed with respect to their ability hold onto water.

Example 11

Water Retention Capacity

The water retention capacity was also measured. The experiment was conducted with the same conditions as Example 10. Normal room conditions in terms of relative humidity and temperature were present. Three cm diameter poly (vinyl chloride) centrifuge tubes were cut from the bottom to create a hole and sealed with a cotton. Soil samples of 40 g was placed in each tube then weighed ($W_1$). The samples were slowly drenched from the top using tap water until the water seeped out of the bottom. After water seepage had stopped from the bottom, the tube was weighed again ($W_2$). In a span of 30 days the tube was weighed every day ($W_d$). Water-retention ratio of the soil was calculated with the following equation:

$$\text{Water}-\text{retention ratio }(\%)=\frac{Wd-W1}{W2-W1}$$

Figure 4:
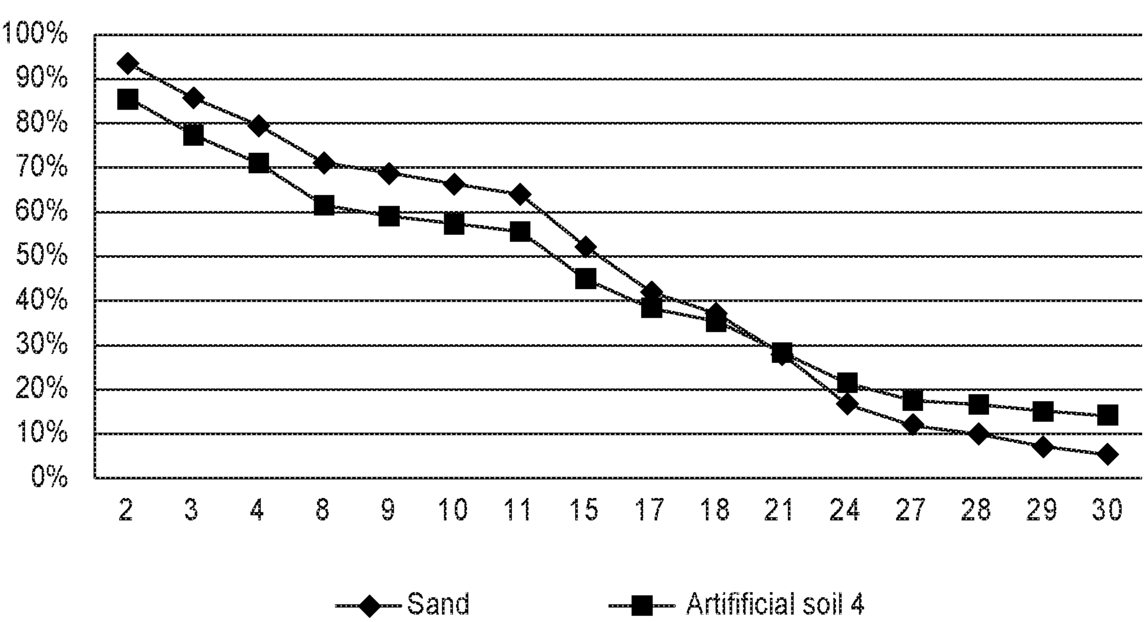
FIG. 4 is a graphical view of water-retention ratio for sand and artificial soil composition 4, according to one or more embodiments of the invention.

Measurements were obtained for artificial soil composition 4 and normal sand. Sand initially had a higher water-retention ratio (FIG. 4) because it held onto less water than the artificial soil as discussed with water-holding capacity above. As days passed, the rate of artificial soil to retain water was constant while the rate of sand to retain water decreased rapidly. At 30 days, the artificial was retained a 14.04% ratio of the water while having more water absorbed. Sand was only able retain a ratio of 5.24% at the end of 30 days. This data supports the artificial soil compositions ability to greatly improve desert sand in terms of being able to hold and retain water. This also applies to nutrients that the artificial soil can hold and retain.

Example 12

Growing Plants from Seeds Using Artificial Soil Compositions

Figure 5A:
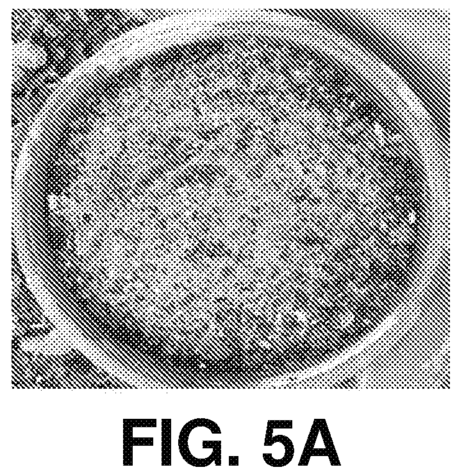
FIGS. 5A-5D are images of (A) an artificial soil composition when seeds were planted; (B) day 6, when first sprout of seeds was observed; (C) day 7, showing how tall the seedlings had grown; and (D) day 14, after 2 weeks around more than 20 seedlings had sprouted, according to one or more embodiments of the invention.
Figure 5B:
Figure 5C:
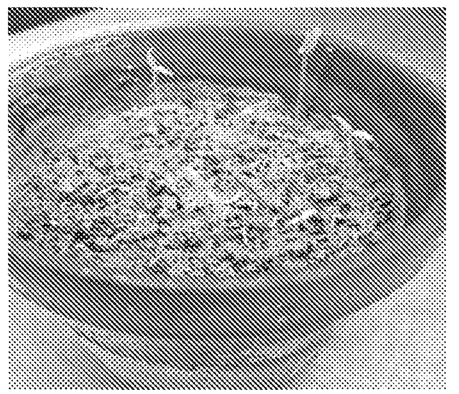
Figure 5D:
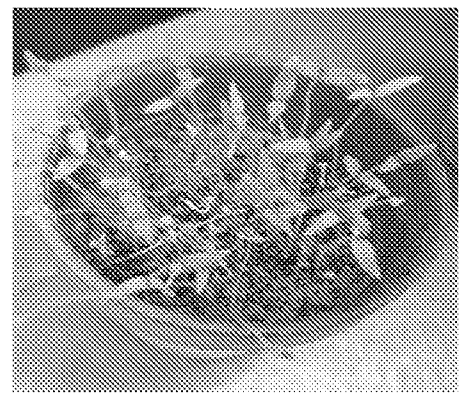
Figures 6A, 6B, 6C, 6D, 6E, 6F, 6G:
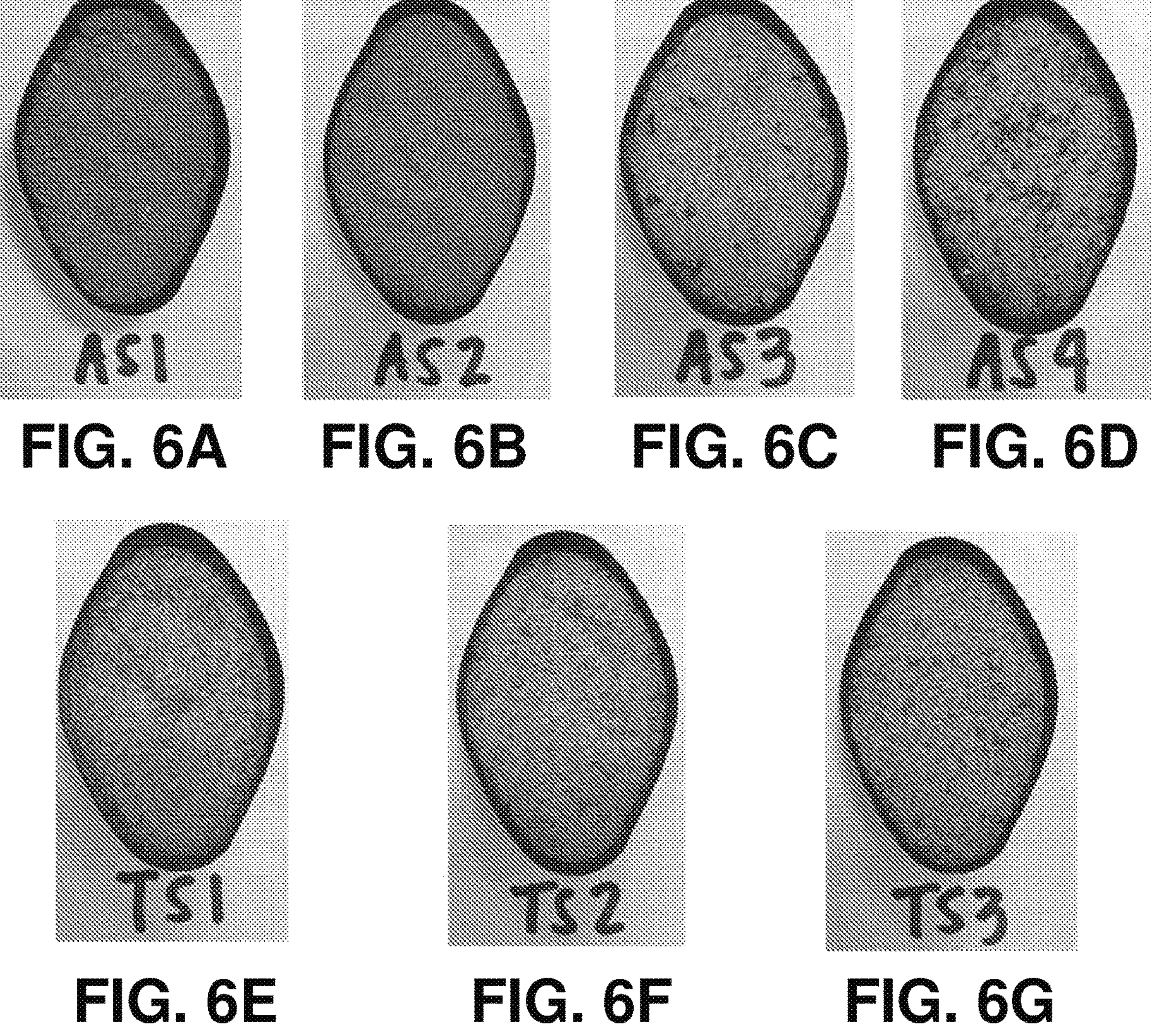
FIGS. 6A-6G are images of (A) artificial soil composition 1; (B) artificial soil composition 2; (C) artificial soil composition 3; (D) artificial soil composition 4; (E) artificial Thailand soil composition 1; (F) artificial Thailand soil composition 2; and (G) artificial Thailand soil composition 3, according to one or more embodiments of the invention.

Artificial soil compositions from Examples 1-7 were used to plant seeds and grow plants indoors. FIGS. 5-6. Tomato seeds were used and bought from a local market. Seeds were planted in a pot with dimensions of 9 cm H×10.5 cm top D×6 cm bottom D and 28 $in^3$ or 45.84 $cm^3$. The pots were filled with soil of 16 $in^3$ or 262.93 $cm^3$ in volume. About 20 to 30 seeds were planted in each pot. Under ideal conditions, seeds would start to sprout at 6 to 8 days after being planted. In the artificial soils, seeds were observed to sprout on the $6^{th}$ day it was planted as shown in FIG. 5B. After 2 weeks more than 20 to 30 seedlings had sprouted. This confirms the ability of the artificial soil compositions disclosed herein to support and sustain plant growth and can be a solution for barren sandy soils such as those in the United Arab Emirates. This invention is up to 80% of fine desert sand which made it a feasible application in agriculture in UAE.

Constructive Example 13

Artificial Soil Compositions Prepared by Wet and Dry Methods

To prepare an artificial soil composition via both wet and dry/solid methods, agar is dissolved in water to form an agar solution. Separately sulfur and sand are mixed together using a ball mill to form a solid mixture. The agar solution and solid mixture are mixed together and agitated thoroughly using a mixture. The resulting mixture is dried and the solid is crushed to final form.

Constructive Example 14

Artificial Soil Compositions Prepared by Wet, Dry, and Extrusion Methods

To prepare an artificial soil composition via, wet, dry, and extrusion methods, clay is dispersed in water. Separately sulfur and agar or chitosan is extruded together at a high temperature in the range of 100 to 250° C. to form oxidized sulfur ($SO_2$), which is also useful as a fertilizer and sulfur carrier, with the agar or chitosan providing a source of solid carbon which is useful for plant growth. Separately sand and bauxite residue are mixed in solid state, crushed, and ball milled. All three separately prepared components are combined and dispersed with the clay in water and mixed thoroughly. The resulting mixture is dried and optionally crushed to final form.

Constructive Example 15

Artificial Soil Compositions Prepared by Extrusion

Agar or chitosan is extruded at a high temperature (e.g., a temperature at or above the melting temperature of the agar or chitosan). Sulfur, bauxite residue, sand, and compost are added to the extruder while the agar or chitosan is in a molten state. The extrudate is produced and allowed to cool to room temperature. The cooled product is then crushed/ball milled to produce the final product. For high viscosity mixtures, high shear extruders may alternatively be used.

What is claimed is:

1. An artificial soil composition for supporting plant growth, the artificial soil composition comprising:

a mixture including an iron oxide-containing industrial byproduct at a proportion of about 15%-25% by weight of the mixture, a sulfur-containing industrial byproduct at a proportion of about 5%-10% by weight of the mixture, and at least one of the following components:

(a) a sand component;

(b) a clay component;

(c) a water-soluble polymer component;

(d) a nitrogen-phosphorus-potassium (NPK) source; and (e) an organic matter component.

2. The artificial soil composition of claim 1, wherein the iron oxide-containing industrial byproduct is bauxite residue.

3. The artificial soil composition of claim 1, wherein the sulfur-containing industrial byproduct is a sulfur-containing byproduct recovered from at least one of oil refining, natural gas processing, and metal smelting.

4. The artificial soil composition of claim 1, wherein the clay component includes at least one of a laponite clay, a kaolinite clay, an illite clay, a montmorillonite clay, a muscovite clay, a saponite clay, a nontronite clay, a hectorite clay, a beidellite clay, a smectite clay, and a sauconite clay.

5. The artificial soil composition of claim 1, wherein the water-soluble polymer component includes at least one of poly(ethylene glycol), polyvinyl pyrrolidone, polyvinyl alcohol, polyvinyl acetate, polyacrylamide, polyoxazoline, polyphosphates, xanthan gum, chitosan, agar, pectin, albumin, polysaccharides, and derivatives thereof.

6. The artificial soil composition of claim 1, wherein the NPK source includes at least one of a fertilizer, a compost, a manure; wherein the organic matter component includes at least one of an activated carbon, a compost, and a crushed charcoal.

7. The artificial soil composition of claim 1, wherein the mass of the sand component is at least equal to the mass of the clay component.

8. The artificial soil composition of claim 1, wherein the mixture includes at least one of the following proportions of components:

about 40%-60% by weight of the sand component;

about 5%-20% by weight of the clay component;

about 1%-5% by weight of the water-soluble polymer component;

about 2.5%-7.5% by weight of the NPK source; and about 15%-20% by weight of the organic matter component.

9. A method of growing plants in an artificial soil composition, the method comprising:

disposing at least one of a seed and a plant in an artificial soil composition of claim 1; and supporting the growth of the seed or plant.

10. A method of making an artificial soil composition comprising:

forming one or more intermediates selected from:

(i) an aqueous mixture by adding water to one or more first components;

(ii) a first mixture by mixing one or more second components; and (iii) an extrudate by extruding one or more third components;

when exactly one of the aqueous mixture, the first mixture, and the extrudate is formed, processing the intermediate to form an artificial soil composition; and when two or more of the aqueous mixture, the first mixture, and the extrudate are formed, mixing the two or more intermediates to form a second mixture and processing the second mixture to form the artificial soil composition, wherein the artificial soil composition comprises: a mixture including an iron oxide-containing industrial byproduct at a proportion of about 15%-25% by weight of the mixture, a sulfur-containing industrial byproduct at a proportion of about 5%-10% by weight of the mixture, and at least one of the following components:

(a) a sand component;

(b) a clay component;

(c) a water-soluble polymer component;

(d) a nitrogen-phosphorus-potassium (NPK) source; and (e) an organic matter component.

11. The method of claim 10, wherein the one or more first components include at least a one clay component and the aqueous mixture includes at least one clay component dispersed in water.

12. The method of claim 10, wherein the one or more first components include at least one water-soluble polymer component and wherein the aqueous mixture includes at least one water-soluble polymer dissolved in water.

13. The method of claim 10, wherein the one or more second components are solids and include one or more of an iron oxide-containing industrial byproduct, a sulfur-containing industrial byproduct, a sand component, an NPK source, and an organic matter component.

14. The method of claim 10, wherein the one or more third components include one or more of a water-soluble polymer component and a sulfur-containing industrial byproduct.

15. The method of claim 10, wherein the one or more third components include one or more of an iron oxide-containing industrial byproduct, a sulfur-containing industrial byproduct, a clay component, a sand component, a water-soluble polymer component, an NPK source, and an organic matter component.

16. The method of claim 10, wherein mixing one or more second components is performed by one or more of crushing, grinding, and milling, in the absence of any water.

17. The method of claim 10, wherein processing includes drying either (i) the intermediate or (ii) the second mixture to remove at least a portion of water.

18. The method of claim 17, wherein processing further includes reducing average particle size of either (i) the intermediate or (ii) the second mixture.

19. The method of claim 10, wherein the iron oxide-containing industrial byproduct is bauxite residue.

20. The method of claim 10, wherein the sulfur-containing industrial byproduct is a sulfur-containing byproduct recovered from at least one of oil refining, natural gas processing, and metal smelting.

* * * * *